Feb. 25, 1969   V. L. SHOTTON   3,429,125
IRRIGATION PIPE WITH EROSION PREVENTING OUTLETS
Filed June 19, 1967
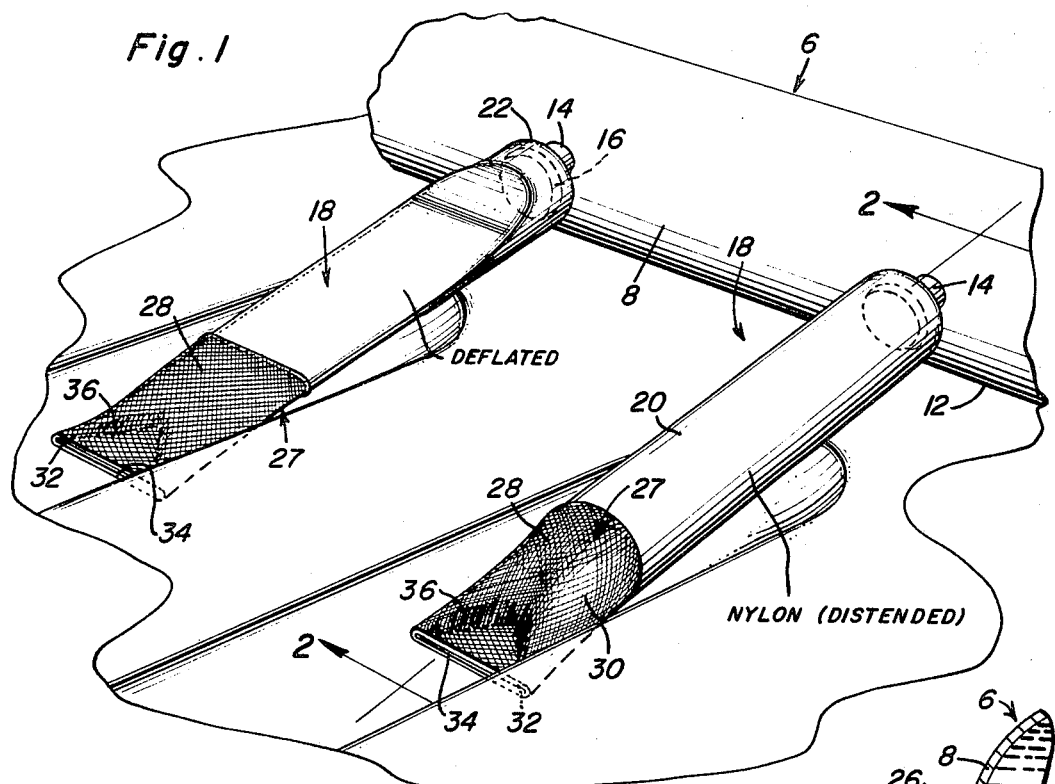
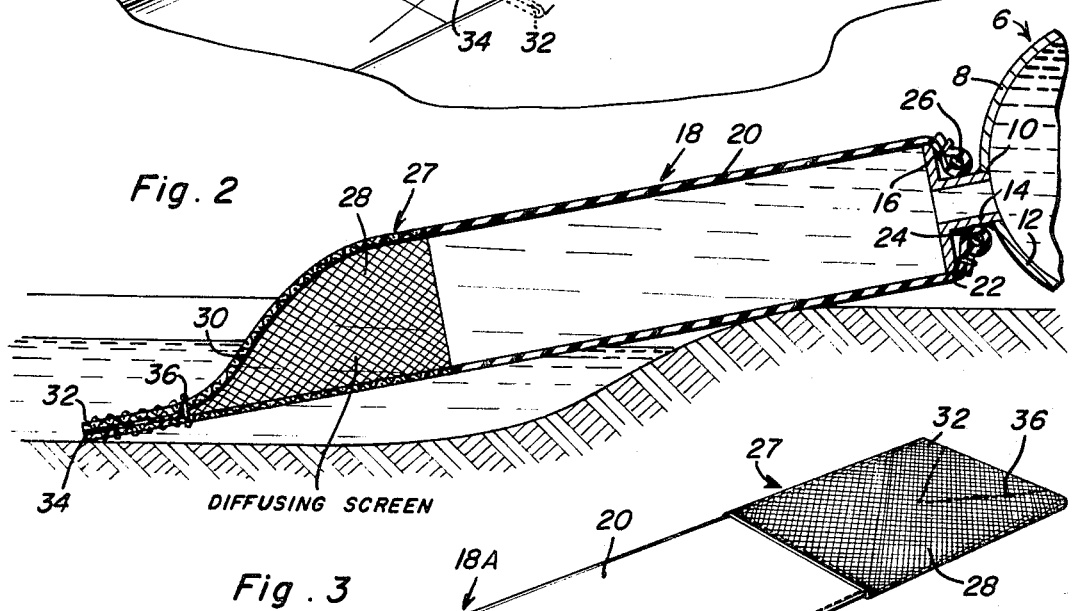
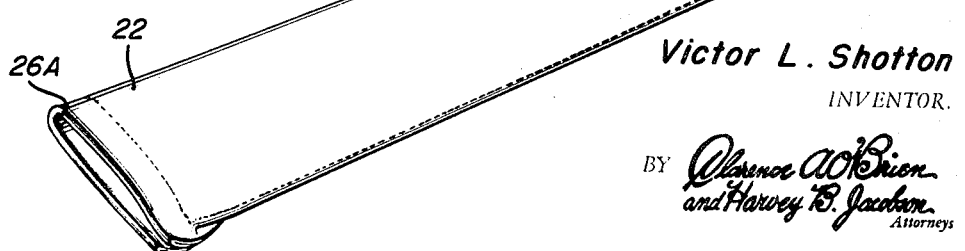
Victor L. Shotton
INVENTOR.

United States Patent Office 3,429,125
Patented Feb. 25, 1969

3,429,125
IRRIGATION PIPE WITH EROSION PREVENTING OUTLETS
Victor L. Shotton, Rural Route, Sublette, Kans. 67877
Filed June 19, 1967, Ser. No. 647,090
U.S. Cl. 61—12
Int. Cl. E02b 13/00
6 Claims

ABSTRACT OF THE DISCLOSURE

The pipe line shown serves, as usual, to transport field irrigating water from a well or other source and is equipped at longitudinally spaced points with suitable outlets, for example, flanged outlets commonly known as dispensing nozzles. To cope with crop row erosion, an erosion preventing sleeve is attached to each nozzle. Each uniquely fabricated sleeve impedes the water flow, reduces velocity, and diffuses the water short of its stitched terminal lips. Experimental use of the improved sleeves has acceptably solved the crop row erosion problem.

---

This invention relates to agricultural irrigation where, as is known, a suitably gated pipe line or conduit serves to transport water from a well or other source and to distributively divert it to closely spaced individual crop rows by way of flanged outlet necks commonly referred to as nozzles. A principal difficulty is that the water issuing from the nozzles erodes the intake end of each associated crop row and results in channeled erosion for quite a distance down the crop row before the pressure and velocity equalize. By attaching suitably devised sleeves to the nozzles erosion difficulties have been effectively minimized.

In the field of endeavor herein under consideration, it is not at all uncommon to flood and irrigate 240 acres from a well. In many instances after the water is delivered to the crop rows one after the other and released it is allowed to run down the row one half mile, more or less which, of course, contributes to the over-all problem and calls for an adequate solution such as can be achieved when the special purpose diffusing sleeves of the present invention are installed and put to use. In order to effectually irrigate the expanse of land under advisement, one has to have maximum volume of water needed. It follows that the present invention well serves its intended purposes and at the same time virtually prevents objectionable erosion at each crop row entrance.

If the crop row irrigating water is not diffused and properly handled at the site of the outlet nozzles it will not only erode the soil at the vulnerable point of discharge it may and often does wash away the ridges between the rows, with the result that water will flood and start running an objectionable course substantially parallel to them ain pipe line. Without the governing and control sleeves of this invention it has been necessary for the operator to stand by and constantly watch or, alternatively, run the risk of an unpleasant defeat of his irrigation program. Then, too, one must keep in mind that the stated crop rows are usually spaced anywhere from 18 to 24 inches. Therefore, numerous erosion preventing sleeves are required and inasmuch as the sleeves are simple, practical, easy-to-use and economical these facts add to the need for sleeves such as the ones herein described.

A general objective of the present invention is to structurally, functionally and otherwise improve upon prior art field and land irrigating pipe systems and, in doing so, to provide a contribution to the art which not only well serves the objectives under consideration but will meet with approval of makers and users.

Briefly, the main conduit or pipe line is common to the art and is provided on either one or both sides near the bottom with flanged dispensing necks which constitute and serve as the aforementioned flow diffusing nozzles. These nozzles are herein and now improved by the addition to each nozzle of flow checking, velocity reducing and regulable means, that is, means which functions to diffuse and directly discharge water for improved irrigating results at a controlled or restricted rate. By making the improved means in the form of expressly constructed nylon or equivalent sleeves the improved result desired is satisfactorily achieved.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing a fragmentary portion of the conventional gated pipe line, two improved diffusing erosion-preventing sleeves (the one at the right inflated and the one at the left deflated for illustration only) and how both sleeves are mounted and used at the entrance ends of the crop rows.

FIG. 2 is a view on an enlarged scale taken approximately on the plane of the section line 2—2 of FIG. 1, and FIG. 3 is a fragmentary perspective view showing a single sleeve in its normal flat or deflated form and wherein the modified hem at the left can be split, if so desired.

The aforementioned conduit or gated pipe line is denoted by the numeral 6. This pipe is provided on one side, say the side 8, with a plurality of longitudinally spaced outlet holes one of which is denoted at 10 (FIG. 2) just above the level of the bottom portion 12 of the conduit. As shown in FIG. 1 each outlet opening is preferably, but not necessarily, provided with outlet means which comprises a relatively short discharge neck 14 provided at its outer end with an outstanding endless flange 16, as detailed in FIG. 2. All of the improved sleeves are basically the same in construction. Each sleeve 18 is flexible, normally flat (FIG. 3) and is approximately 36 inches in length and is characterized by a major part which is described as the body portion 20 and inner attaching end portion 22. This end portion is adapted to be fitted over the flanged neck or nozzle in the manner shown in FIG. 2. It may be and preferably is securely held in place by an elastic O-ring 24 fitted and retained in an appropriately formed hem 26. The portion 20 is substantially 24 inches in length, is imperforate and is coated with neoprene. The remaining 12 inch component part or portion (to the left in FIG. 2) and denoted generally by the numeral 27 is specially fabricated to provide a fine mesh water diffusing screen. This screen portion is denoted generally by the numeral 28 and it will be seen that, when the sleeve is inflated and distended, it is gradually reduced in cross-section as denoted at 30 and merges into a free terminal flattened end portion characterized by a pair of upper and lower flat lip portions 32 and 34. The median portions of the lip portions are stitched together as denoted at 36 in FIG. 1. This partially stitched terminal end portion could be stitched completely across and wholly closed to reduce velocity to a degree sufficient, as experience has shown, to virtually prevent ground or soil erosion. This V-like stitching and closing (wholly or partially) of the lip portions 32 and 34 of the screened end functions not only to impede the flow of water, it slows down the velocity with the result that the water is diffused in the manner and for the purposes desired.

The manner in which the inner end 22 is constructed to provide the attaching and retaining result and the manner of use is shown in FIG. 2. The manner in which the unique sleeve is distended or inflated when in use is also shown in FIG. 2, and the manner in which two or more sleeves (one distended and carrying water at the right) serve in conjunction with the conduit 6 is shown in FIG. 1.

It is to be pointed out that the hem-equipped end (24 and 26 FIG. 2) is not the only manner of attaching the improved sleeve to the pipe 6. This is to say, the O-ring alone is not the only way of mounting the sleeve. In fact, the modified sleeve 18A (FIG. 3) can be used. In this connection it will be seen that this adaptation, with the uniquely slitted hem 26A, can be constructed to thread onto a wire clamp device (not shown) that fits over the main supply pipe 8 that does not have an extending distributing or dispensing nozzle 14, but merely a cut opening in the main pipe. These wire clamps are commonly used in this area, and have a running end that by stitching the hem on the sleeve and cutting a small slit the sleeve can be threaded onto the running end of the clamp and thus properly held in place.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a conduit designed and adapted to transport and deliver irrigation water from a source, a well for example, to a field or expanse of land having spaced parallel rows of crops, said conduit provided on at least one side and adjacent its bottom with spaced water outlets which are adapted to be distributively aligned with cooperable crop rows, each outlet being provided with water flow checking, velocity reducing and diffusing means for capably directing and discharging the pressurized outflowing water for adequate but controlled irrigation needs in a manner to minimize eroding of soil at the point of discharge and to properly govern the flow of water into predetermined crop rows, each outlet comprising a reduced integral neck terminating in a flanged end portion and constituting a water proportioning and discharge nozzle, and a complemental elongated sleeve lateral to said conduit, said sleeve having an inner end portion communicatively and readily attachable to and detachable from said neck and retained in its operative position by said flanged end portion, the outer discharge end of said sleeve being terminally flattened, the flattened portions defining upper and lower lips, said lips being superimposed upon each other, median portions only of said lips being stitched together to impede the flow and restrict the velocity thereof, the main body and inner end portion of said sleeve being imperforate and flexible and said outer end portion, including said lips, comprising a fine mesh screen through the medium of which the outflowing stream of water is diffused, whereby to minimize erosion of the soil at the outer discharge end of said sleeve.

2. The combination according to claim 1, and wherein said inner end is provided with an endless hem provided with expansible and contractible means which provides a manually attachable and detachable but fluid-tight connection between said nozzle and sleeve.

3. The combination according to claim 1, and wherein said inner end is provided with an endless hem provided with and contains an expansible and contractible O-ring which provides a manually attachable and detachable but fluid-tight connection between said nozzle and sleeve.

4. An erosion minimizing water transporting pipe line attachment comprising, a normally flat flexible elongated nylon sleeve, the median body portion and inner attachable intake end portion of said sleeve being coated with a synthetic rubber such as neoprene and being impervious to the leakage of water, the outer discharge end portion of said sleeve being fabricated of fine mesh water screening and diffusing material and being flattened at its free terminal end to provide a pair of face-to-face overlapping lips, and median portions of said lips being stitched together in a manner to check, impede and regulate the flow of the stream of water.

5. The sleeve defined in and according to claim 4, and wherein the inner attachable end portion of said sleeve is provided with a hem, and an elastic O-ring encased in said hem.

6. The sleeve defined in claim 4, and wherein said inner attachable end portion is provided at its free terminal end with a transversely split open ended hem which is designed and adapted to receive and encase insertable and removable retaining means.

References Cited
UNITED STATES PATENTS

| | | | |
|---|---|---|---|
| 2,410,786 | 11/1946 | Mallory | 285—260 |
| 2,593,299 | 4/1952 | Grumbles | 61—12 |
| 2,595,408 | 5/1952 | Quest | 61—12 |
| 3,050,801 | 8/1962 | Downey | 61—12 |
| 3,315,895 | 4/1967 | Klingbeil et al. | 239—145 |

EARL J. WITMER, *Primary Examiner.*

U.S. Cl. X.R.
239—145, 542